United States Patent [19]

Yagi et al.

[11] Patent Number: 4,837,282

[45] Date of Patent: Jun. 6, 1989

[54] POLYOLEFIN RUBBER COMPOSITION

[75] Inventors: Kiyoshi Yagi; Toshiaki Kanno; Masahiro Kanda; Izumi Nomura, all of Gotenba, Japan

[73] Assignee: Yazaki Corporation, Japan

[21] Appl. No.: 93,259

[22] Filed: Sep. 4, 1987

Related U.S. Application Data

[63] Continuation of Ser. No. 861,409, Jun. 9, 1986, abandoned.

[30] Foreign Application Priority Data

May 13, 1985 [JP] Japan .................................. 60-99490

[51] Int. Cl.$^4$ ...................... C08L 23/16; C08F 255/06
[52] U.S. Cl. .................................. 525/265; 525/263; 525/290; 525/304
[58] Field of Search ................ 525/263, 265, 290, 304

[56] References Cited

U.S. PATENT DOCUMENTS

| | | | |
|---|---|---|---|
| 3,261,888 | 7/1966 | Cornell et al. ...................... | 525/263 |
| 3,968,185 | 7/1976 | Baldwin et al. ..................... | 525/262 |
| 3,970,723 | 7/1976 | Mees et al. .......................... | 525/263 |
| 4,208,491 | 6/1980 | Gardner .............................. | 525/265 |

FOREIGN PATENT DOCUMENTS 49-128953  10/1974  Japan .................................. 525/263

*Primary Examiner*—Wilbert J. Briggs Sr.
*Attorney, Agent, or Firm*—Wigman & Cohen

[57] ABSTRACT

A polyolefin rubber composition consisting essentially of 100 parts by weight of a polyolefin rubber polymer, 10 to 100 parts by weight of a mono-olefin monomer, 1 to 20 parts by weight of a polyolefin polyfunctional monomer, and 0.1 to 15 parts by weight of an organic peroxide, wherein these components are blended and subjected to heat treatment to form a denaturated polyolefin rubber.

The mechanical and electrical characteristics of this denaturated polyolefin rubber do not deteriorate even after long-time subjection to heat treatment, and this material finds application as a rubber for thermally resistant electrical products.

5 Claims, 2 Drawing Sheets

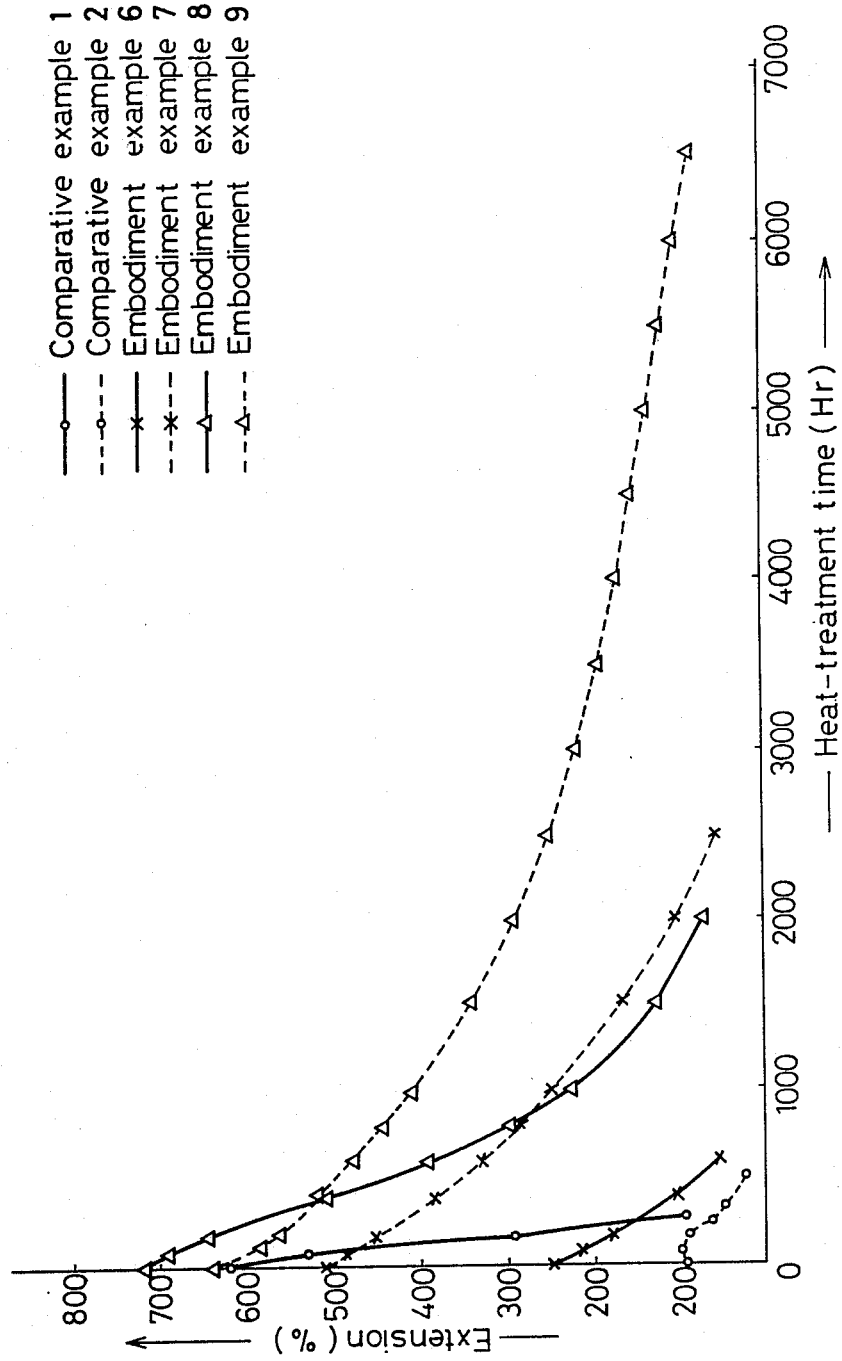

POLYOLEFIN RUBBER COMPOSITION

This is a continuation of co-pending application Ser. No. 861,409 filed on May 9, 1986, now abandoned.

BACKGROUND OF THE INVENTION

1. Field of the Invention

The present invention relates to a polyolefin rubber composition, which is the precursor for a denaturated polyolefin rubber, and to a manufacturing method for a denaturated polyolefin rubber, and more specifically to a denaturated polyolefin rubber which can be utilized as a rubber material for industrial parts and the like which are used in a high-temperature environment.

2. Description of the Prior Art

Polyolefin rubbers are utilized for many different types of industrial parts, because of their properties of chemical stability and resistance to deterioration. Further, polyolefin rubbers are especially used for electrical applications because of superior electrical insulation qualities. However, when they are utilized for electrical parts which are used under a high temperature and in a vibrating environment, such as in the engine of an automobile, they have not always been able to satisfy the requirements for resistance to deterioration.

It is generally considered that the deterioration of rubber materials is caused by oxidation from oxygen and ozone in the air, and from localized activation of the rubber molecule chains from ultraviolet rays and the like, and from the rupture and recombination of the molecule chains. As a means to prevent or delay this change in molecular structure, an antioxidant is mixed with the rubber material. However, the blending of large volumes of an antioxidant which is effective at high temperatures, as a means of improving resistance to heat deterioration, is not always favorable with respect to performance of the rubber plastic parts and the economics. Accordingly, the use of the compositions for improvement in heat resistance is limited.

SUMMARY OF THE INVENTION

An object of the present invention is to provide, with due consideration to the drawbacks of such conventional devices, a precursor for a denaturated polyolefin rubber and a manufacturing method for a denaturated polyolefin rubber.

A further object of the present invention is to provide a precursor for a denaturated polyolefin rubber and a manufacturing method for a denaturated polyolefin rubber in which the addition of an antioxidant is unnecessary.

A still further object of the present invention is to provide a precursor for a denaturated polyolefin rubber with low hardness, high strength, and superior electrical properties, and with superior mechanical characteristics after high temperature treatment, and to provide a manufacturing method for such a denaturated polyolefin rubber.

In order to accomplish these objects, the polyolefin rubber compositions of the present invention comprises 100 parts by weight of a polyolefin rubber polymer, 10 to 100 parts by weight of a mono-olefin monomer, 1 to 20 parts by weight of a polyolefin polyfunctional monomer, and 0.1 to 15 parts by weight of an organic peroxide.

In addition, the manufacturing method for the denaturated polyolefin rubber consists of mixing the 10 to 100 parts by weight of mono-olefin monomer, 1 to 20 parts by weight of a polyolefin polyfunctional monomer, and 0.1 to 15 parts by weight of an organic peroxide with the 100 parts by weight of the polyolefin rubber polymer and applying heat to the mixture.

BRIEF DESCRIPTION OF THE DRAWINGS

FIG. 2 is a graph showing the relationship between the extension and the time subjected to heat treatment of denaturated polyolefin rubbers obtained in embodiment examples 6 to 9, and comparative examples 1 and 2.

DESCRIPTION OF THE PREFERRED EMBODIMENTS

Figure 1:
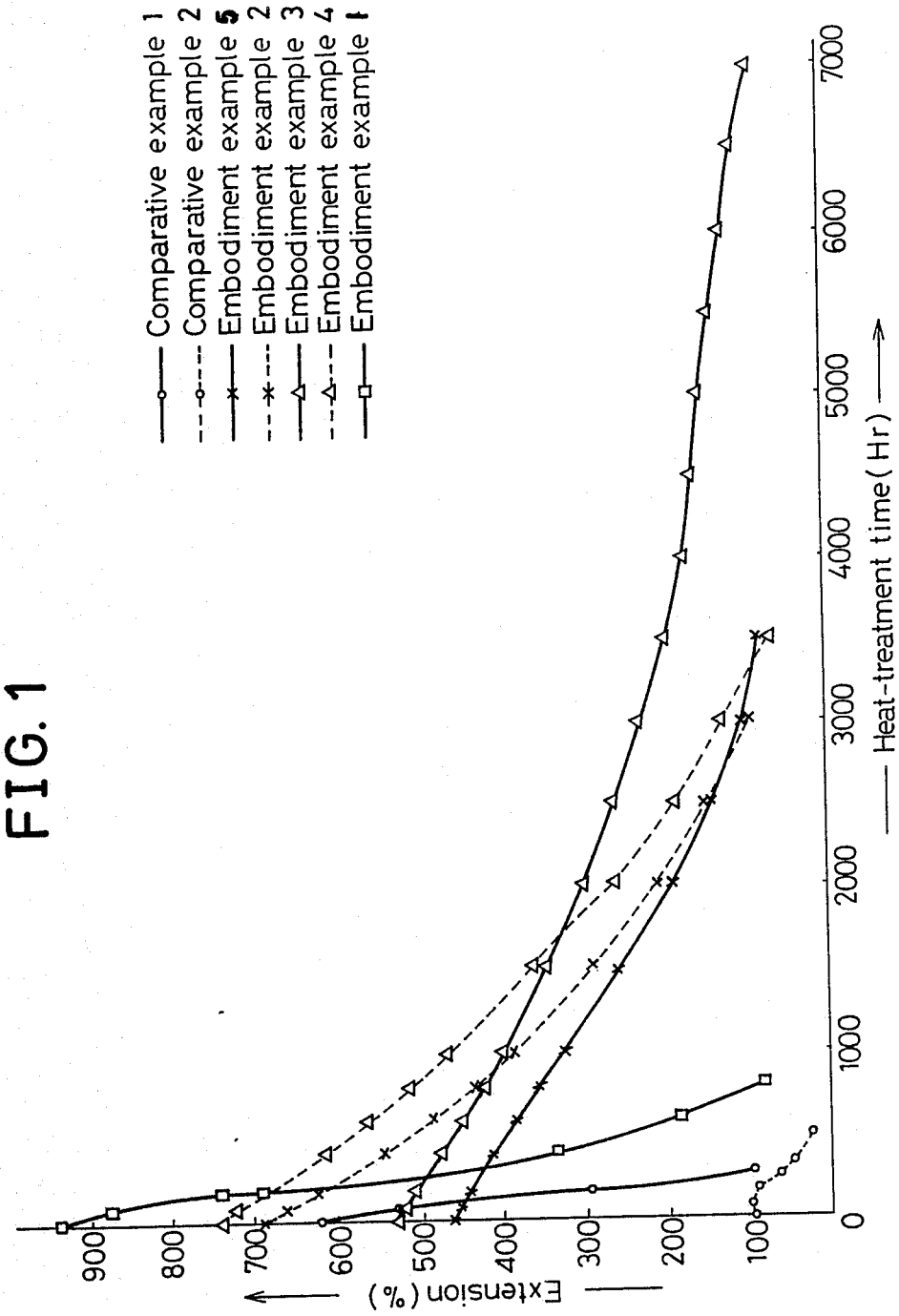
FIG. 1 is a graph showing the relationship between the extension and the time subjected to heat treatment of denaturated polyolefin rubbers obtained in embodiment examples 1 to 5, and comparative examples 1 and 2.

The polyolefin rubber polymer used in the present invention is preferably a polymer having a chain structure including principally ethylene monomers ($-CH_2-CH_2-$) and alpha-olefin monomers ($-CH_2-CRR'-$). The ethylene monomer may be in the 5 to 95 mol percent range but is preferably in the 40 to 90 mol percent range, while the alpha-olefin monomer may be in the 5 to 95 mol percent range but is preferably in the 10 to 60 mol percent range. In this type of polymer, in order to provide ease in crosslinking, a conjugate or non-conjugate diolefin may be provided at less than 50 mol percent, but the introduction of 3 to 20 mol percent at time of polymerization is more preferable. Furthermore, in the alpha-olefin monomer, R may be a lower alkyl radical with from one to four carbon atoms, and R' may be a lower alkyl radical with one to four hydrogen or carbon atoms. A conjugate diolefin such as butadiene or isoprene, or a non-conjugate diolefin such as 1,4-hexadiene, dicyclopentadiene, or ethylidene norbornene may be used, but among these the butadiene is preferable.

A suitable mono-olefin monomer for use in the present invention is one which can polymerize as a liquid or a solid radical at normal temperatures and not disperse when blended with the components. Examples are styrene, acrylnitrile, methyl methacrylate, ethyl methacrylate, ethyl acrylate, vinyl acetate. Among these, however, styrene and methyl methacrylate are preferable.

The amount of mono-olefin monomer used is 10 to 100 parts by weight for 100 parts by weight of the polyolefin rubber polymer. If the amount used is less than 10 parts by weight the improvement in heat resistance is not remarkable, while, on the other hand, if this amount is greater than 100 parts by weight the material becomes very hard and is of no practical use.

As a polyolefin polyfunctional monomer, one which can radical copolymerize as a liquid or a solid radical at normal temperatures and not disperse when blended with the components is suitable. As examples, when styrene is used as the mono-olefin monomer, divinylbenzene and the like may be used, and when methyl methacrylate is used, trimethylolpropane trimethacrylate and the like may be used. However, the present invention is not limited to these materials.

The amount of the polyolefin polyfunctional monomer used is 1 to 20 parts by weight for 100 parts by weight of the polyolefin rubber polymer. If the amount used is less than 1 part by weight the improvement in heat resistance is small, while if 20 parts by weight is exceeded, the improvement effect is not simply saturated but the elongation is reduced. In addition, if the amount of the polyolefin polyfunctional monomer is increased in comparison with the amount of the mono-olefin monomer used, the strength is increased, but there is no improvement in cost reduction.

A suitable organic peroxide for use in the present invention is one which does not disperse when blended with the components and for which the speed of dissolving is not too great; which is a liquid or a solid at normal temperatures; and for which the temperature where the half-value period is 10 hours is in the range of 80 to 130 degrees C. Examples of such an organic peroxide are dicumyl peroxide, 2,5-dimethyl-2,5-di tertiary peroxy-3,3,5-trimethylcyclohexane, and the like.

The amount of organic peroxide used is 0.1 to 15 parts by weight for 100 parts by weight of the polyolefin rubber polymer, which is the amount effective for hardening of the rubber by means of crosslinkage and polymerization of the monomers.

The polyolefin rubber composition of the present invention comprises the above mentioned components. However, in addition, an antioxidant, an anti-weathering agent, a pigment, a viscosity adjusting agent, an inorganic additive, and a fiber reinforcing agent can be blended with them. Moreover, another vinyl polymer, a synthetic resin elastomer, natural rubber, and the like can be blended with them, as long as they don't detract the physical properties of the polyolefin rubber.

This polyolefin rubber composition is then blended, and a denaturated polyolefin rubber can be manufactured by subjecting the mixture to heat treatment.

When the polyolefin rubber composition of the present invention is heated, the organic peroxide decomposes and acts as a radical polymerization initiator. The mono-olefin monomer and the polyolefin polyfunctional monomer begin to polymerize but because the polyfunctional monomer is present, crosslinking occurs. At the same time, because hydrogen is split off from the molecular chain of the polyolefin rubber polymer a graft-polymerization is also started, and it is believed that the denaturated polyolefin rubber which is denaturated by the mono and polyolefin is formed.

When the denaturated polyolefin rubber is produced, mixing can be performed using a commonly-known mixing means such as a mixing roll, a Banbury mixer and the like. A temperature close to ambient temperature is desirable as the mixing temperature.

The heating can be performed at the same time as the mixing, or can be performed consecutively. While heating, extruding can be carried out in either a single- or double-shafted extruder. The heating may be performed in a heating press while the rubber is being continuously formed. The heating temperature must not exceed the vapor pressure of the monomer. Also, a time-temperature relationship must be selected so that the process is carried out above the decomposition temperature of the organic peroxide, and the crosslinking reaction is completed. The denaturated polyolefin rubber of the present invention is produced in this manner. The denaturated polyolefin rubber may also be formed as pellets and the final product may also be formed directly into its finished form.

The present invention will now be specifically explained with reference to the following examples, but these examples are not restrictive.

EMBODIMENT EXAMPLES 1 TO 9 AND COMPARATIVE EXAMPLES 1 AND 2

In embodiments of the present invention, EPDM or ethylene-butylene polymer was used as the polyolefin rubber polymer. To 100 parts by weight of the polyolefin rubber polymer, styrene and divinyl benzene, or methyl methacrylate and trimethylolpropane trimethacrylate, as the mono-olefin monomer and polyolefin polyfunctional monomer respectively, were combined in the amounts by weight as indicated in Table 1 and blended. Also, dicumyl peroxide, was added as the organic peroxide in the amount of 2.7 parts by weight, and an amino antioxidant and a thioester antioxidant were added in the amount of one part by weight each. In addition, clay was added as an viscosity adjustment for nonhardened component at 20 parts by weight. The polyolefin rubber composition was manufactured by blending these components.

In order to make a comparison, talc, white carbon, and zinc flower as well as a processing aid, were added to EPDM as first normal polyolefin rubber composition. As second normal polyolefin rubber composition, a xylene formaldehyde resin and a clay were added to the EPDM. Clay was added to adjust the viscosity and antioxidants and an organic peroxide were blended in, in the same way as for the Embodiment Examples.

These example and comparative example compositions were formed and hardened in a press for five minutes at 180° C. to obtain the denaturated polyolefin rubber. The following types of characteristics were evaluated.

Hardness : A-type spring hardness test according to JISK Articles 6301 to 5.
Tensile strength : No. 3 type dumbell used according to JISK
and elongation Articles 6301 to 3.
Tear strength : A-type used according to JISK Articles 6301 to 9.
Volume specific : According to ASTMD991.
resistance
Withstand voltage : According to ASTMD149.
Dielectric constant : According to ASTMD150. and dielectric dissipation factor
Thermal resistance: According to JISK Articles 6301 to 6.3. Here, the samples were heat-treated at 150° C., and the relationship between treatment time and extension was checked until extensions of the Example became less than 100%.

The results of these evaluations, with the exception of the thermal resistance, are shown in Table 2 covering mechanical and electrical characteristics.

TABLE 1

| | (Units: Parts by weight) | | | | | | | | | | |
|---|---|---|---|---|---|---|---|---|---|---|---|
| | Comparative Example 1 | Comparative Example 2 | Example 1 | Example 2 | Example 3 | Example 4 | Example 5 | Example 6 | Example 7 | Example 8 | Example 9 |
| EPDM | 100 | 100 | 100 | 100 | 100 | 100 | 100 | 100 | 100 | 100 | |
| Ethylene-butylene polymer | | | | | | | | | | | 100 |
| Xylene formaldehyde resin | | 60 | | | | | | | | | |

TABLE 1-continued (Units: Parts by weight)

| | Comparative Example 1 | Comparative Example 2 | Example 1 | Example 2 | Example 3 | Example 4 | Example 5 | Example 6 | Example 7 | Example 8 | Example 9 |
|---|---|---|---|---|---|---|---|---|---|---|---|
| Styrene | | | 18 | 36 | 54 | 58 | 48 | | | | 54 |
| Methyl methacrylate | | | | | | | | 18 | 54 | 58 | |
| Divinyl benzene | | | 2 | 4 | 6 | 2 | 12 | | | | 6 |
| Trimethylolpropane trimethacrylate | | | | | | | | 2 | 6 | 2 | |
| Amino antioxidant | 1 | 1 | 1 | 1 | 1 | 1 | 1 | 1 | 1 | 1 | 1 |
| Thioester antioxidant | 1 | 1 | 1 | 1 | 1 | 1 | 1 | 1 | 1 | 1 | 1 |
| Processing aid | 3 | | | | | | | | | | |
| Wax | 3 | | | | | | | | | | |
| Paraffin oil | 5 | | | | | | | | | | |
| White carbon | 20 | | | | | | | | | | |
| Talc | 80 | | | | | | | | | | |
| Clay | | 20 | 20 | 20 | 20 | 20 | 20 | 20 | 20 | 20 | 20 |
| Zinc flower | 5 | | | | | | | | | | |
| Dicumyl peroxide | 2.7 | 2.7 | 2.7 | 2.7 | 2.7 | 2.7 | 2.7 | 2.7 | 2.7 | 2.7 | 2.7 |

TABLE 2

| | | Comparative Example 1 | Comparative Example 2 | Example 1 | Example 2 | Example 3 |
|---|---|---|---|---|---|---|
| Characteristic | Hardness (JIS A) | 72 | 94 | 45 | 54 | 59 |
| | Tensile strength (kgf/cm$^2$) | 112 | 152 | 76 | 143 | 2273 |
| | Elongation (%) | 620 | 90 | 940 | 690 | 530 |
| | Tear strength (kgf/cm) | 37 | 54 | 22 | 46 | 53 |
| Electrical Characteristic | Volume specific resistance (.cm) | $5 \times 10^{14}$ | $3 \times 10^{14}$ | $7 \times 10^{14}$ | $7 \times 10^{14}$ | $7 \times 10^{14}$ |
| | Withstand voltage (k.v/mm) | 22 | 20 | 26 | 27 | 27 |
| | Dielectric constant (—) | 3.3 | 4.5 | 2.5 | 2.5 | 2.5 |
| | Dielectric dissipation factor (—) | $1 \times 10^{-2}$ | $4 \times 10^{-2}$ | $4 \times 10^{-3}$ | $4 \times 10^{-3}$ | $4 \times 10^{-3}$ |

| | | Example 4 | Example 5 | Example 6 | Example 7 | Example 8 | Example 9 |
|---|---|---|---|---|---|---|---|
| Characteristic | Hardness (JIS A) | 57 | 63 | 43 | 56 | 55 | 71 |
| | Tensile strength (kgf/cm$^2$) | 195 | 245 | 57 | 133 | 118 | 274 |
| | Elongation (%) | 740 | 460 | 250 | 510 | 720 | 640 |
| | Tear strength (kgf/cm) | 49 | 56 | 16 | 31 | 28 | 73 |
| Electrical Characteristic | Volume specific resistance (.cm) | $8 \times 10^{14}$ | $7 \times 10^{14}$ | $6 \times 10^{14}$ | $8 \times 10^{14}$ | $7 \times 10^{14}$ | $8 \times 10^{14}$ |
| | Withstand voltage (k.v/mm) | 27 | 27 | 26 | 27 | 26 | 29 |
| | Dielectric constant (—) | 2.5 | 2.5 | 2.5 | 2.5 | 2.5 | 2.5 |
| | Dielectric dissipation factor (—) | $4 \times 10^{-3}$ | $4 \times 10^{-3}$ | $4 \times 10^{-3}$ | $4 \times 10^{-3}$ | $4 \times 10^{-3}$ | $4 \times 10^{-3}$ |

The above results show that the denaturated polyolefin rubber of the present invention generally has a low hardness and high strength, as well as a large elongation. In addition, the electrical characteristics are superior to those of the comparative examples.

The thermal resistance results are given in FIG. 1 and FIG. 2. When the denaturated polyolefin rubber of the present invention is compared with Comparative Example 1, which is a conventionally used, commonly-known polyolefin rubber, it is seen that, even after heat treatment at 150° C., the drop in elongation is greatly improved, and the extent of the improvement increases remarkably as the amounts of mono-olefin monomer and polyolefin polyfunctional are increased.

In addition, for Comparative Example 2 which had xylene formaldehyde resin blended in, in place of the usual filler added to strengthen the conventional material, has an extremely small amount of elongation compared with the denaturated polyolefin rubber of the present invention, and its practical utilization in forming into a item of rubber may not be expected.

As indicated above, the polyolefin rubber composition of the present invention is obtained by blending with new materials. The denaturated polyolefin rubber obtained by blending and heat-treating this composition has low hardness, high strength, superior electrical characteristics, and its thermal resistance is considerably improved so that it is expected to be utilized for making rubber parts for electrical products for use at high temperatures.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A polyolefin rubber composition for a polyolefin rubber which has superior electrical insulation and considerably-improved heat resistance, consisting essentially of:
   (a) 100 part by weight (pbw) ethylenic copolymer;
   said ethylenic copolymer being a copolymer consisting essentially of from 40 to 90 mol percent ethylene, from 10 to 60 mol percent alpha-olefin monomer other than ethylene, and from 3 to 20 mol percent conjugate or non-conjugate diolefine monomer;
   (b) from 18–58 pbw monoethylenically unsaturated monomer to improve the heat-resistance of said polyolefin rubber;
   said monoethylenically unsaturated monomer selected from the group consisting of styrene and methylmethacrylate;
   (c) from 2–12 pbw polyethylenically unsaturated monomer for vulcanizing said ethylenic copolymer to improve the heat-resistance of said polyolefin rubber;
   said polyethylenically unsaturated monomer selected from the group consisting of divinyl benzene and trimethylolpropane trimethacrylate;
   wherein the ratio of the weight of said polyethylenically unsaturated monomer to that of said monoethylenically unsaturated monomer is about 0.03–0.25,
   wherein said polyethylenically unsaturated monomer is divinyl benzene when styrene is used as the monoethylenically unsaturated monomer, and trimethylolpropane trimethacrylate when methylmethacrylate is used as the monethylenically unsaturated monomer; and
   (d) from 0.1 to 15 pbw organic peroxide for initiation of the vulcanization.

2. The polyolefin rubber made from the composition of claim 1, having the following improved electrical characteristics especially useful in connection with an automobile engine:
   withstands voltage: at least 26 KV/mm
   dielectric constant: 2.5
   dielectric dissipation factor: $4 \times 10^{-3}$.

3. The polyolefin composition according to claim 1, wherein said organic peroxide is taken from the group consisting of dicumyl peroxide, 2,5-dimethyl-2,5-ditertiary butylperoxyhexane and 1-1-bis tertiary butyl peroxy 3,3,5-trimethylcyclohexane.

4. The composition according to claim 1, wherein said organic peroxide is dicumyl peroxide.

5. The composition according to claim 4, wherein said dicumyl peroxide is present in 2.7 pbw.

* * * * *

UNITED STATES PATENT AND TRADEMARK OFFICE
CERTIFICATE OF CORRECTION

PATENT NO. : 4,837,282
DATED : June 6, 1989
INVENTOR(S) : Kiyoshi YAGI et al

It is certified that error appears in the above-identified patent and that said Letters Patent is hereby corrected as shown below:

FRONT PAGE:

Related U.S. Application Data:

"Continuation of Ser. No. 861,409, Jun. 9, 1986, abandoned" should be
--Continuation of Ser. No. 861,409, May 9, 1986, abandoned--

Signed and Sealed this

Tenth Day of April, 1990

Attest:

HARRY F. MANBECK, JR.

Attesting Officer

Commissioner of Patents and Trademarks